United States Patent
Wideman et al.

(10) Patent No.: US 6,512,036 B2
(45) Date of Patent: Jan. 28, 2003

(54) RUBBER COMPOSITION COMPRISING PENTAERYTHRITOL DERIVATIVE AND TIRE WITH COMPONENT THEREOF

(75) Inventors: Lawson Gibson Wideman, Hudson, OH (US); Neil Arthur Maly, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 18 days.

(21) Appl. No.: 09/771,829

(22) Filed: Jan. 29, 2001

(65) Prior Publication Data

US 2002/0143086 A1 Oct. 3, 2002

(51) Int. Cl.⁷ .................................................. C08K 5/11
(52) U.S. Cl. ................... 524/311; 524/292; 524/306; 524/387; 525/331.9; 152/564; 152/905
(58) Field of Search ................... 524/311, 387, 524/388, 390, 292, 306; 568/853; 525/32.2, 37, 88, 92 F, 261, 332.6, 332.9, 333.1, 333.3, 333.2

(56) References Cited

U.S. PATENT DOCUMENTS 3,617,352 A * 11/1971 Shima et al. ............... 117/76 F
3,661,623 A * 5/1972 Bhakuni et al. ............ 117/76 T
5,877,269 A   3/1999 Koch ........................ 586/176

FOREIGN PATENT DOCUMENTS

EP   0314271    5/1989   ............. B60C/1/00
GB   2363124    6/2001   ......... C08F/236/04

OTHER PUBLICATIONS

Brochure "Esters for Industry" published by The C. P. Hall Company, 7300 South Central Avenue, Chicago, Illinois 60638.

* cited by examiner

Primary Examiner—Edward J. Cain
Assistant Examiner—Katarzyna I Wyrozebski Lee
(74) Attorney, Agent, or Firm—Henry C. Young, Jr.

(57) ABSTRACT

The invention relates to a sulfur curable (and cured) rubber composition which contains one or more pentaerythritol derivatives as pentaerythritol tetrabenzoate (PTB) and/or pentaerythritol tetrakis (3,5-di-tert-butyl-4-hydroxyhydrocinnamate) (PTHC) together with a low molecular weight polyester sebacate. Such combination of materials has been observed to increase resistance to tear for a rubber composition. The invention particularly relates to a tire having a component comprised of such rubber composition.

20 Claims, No Drawings

RUBBER COMPOSITION COMPRISING PENTAERYTHRITOL DERIVATIVE AND TIRE WITH COMPONENT THEREOF

FIELD OF THE INVENTION

The invention relates to a sulfur curable (and cured) rubber composition which contains one or more pentaerythritol derivatives as pentaerythritol tetrabenzoate (PTB) and/or pentaerythritol tetrakis (3,5-di-tert-butyl4-hydroxyhydrocinnamate) (PTHC) together with a low molecular weight polyester sebacate. Such combination of materials has been observed to increase resistance to tear for a rubber composition. The invention particularly relates to a tire having a component comprised of such rubber composition.

BACKGROUND OF THE INVENTION

Rubber compositions for various components of tires are typically optimized for their physical properties. For example, for tire treads, the rubber compositions are usually optimized for traction, rolling resistance and/or treadwear.

For such components, as well as other components such as for example tire sidewall, tread base for a tire with a tread of a cap/base construction, are sometimes desired to be provided with a suitable resistance to tear, such as resistance to tear initiation.

In the description of this invention, the term "phr," where used herein, and according to conventional practice, refers to "parts of a respective material per 100 parts by weight of rubber or elastomer".

In the description of this invention, the terms "rubber" and "elastomer," if used herein, may be used interchangeably, unless otherwise prescribed. The terms "rubber composition," "compounded rubber" and "rubber compound," if used herein, are used interchangeably to refer to "rubber which has been blended or mixed with various ingredients and materials" and such terms are well known to those having skill in the rubber mixing or rubber compounding art.

SUMMARY AND DESCRIPTION OF THE INVENTION

In accordance with this invention, a rubber composition is provided which comprises, based upon parts by weight per 100 parts by weight elastomer (phr);

(A) 100 parts by weight of at least one diene-based elastomer, (B) about 1 to about 20, alternately about 5 to about 15, phr of:
  (1) pentaerythritol tetrabenzoate (PTB) or
  (2) pentaerythritol tetrakis (3,5-di-tert-butyl4-hydroxyhydrocinnamate) (PTHC), and (C) about 1 to about 20, alternately about 5 to about 15, phr of polyester sebacate having a molecular weight in a range of about 1000 to about 3000 so long as it has a melting point below 0° C.

In further accordance with this invention, said rubber composition is provided as a sulfur cured rubber composition.

In additional accordance with this invention, an article of manufacture is provided having at least one component comprised of such rubber composition, or sulfur cured rubber composition.

In further accordance with this invention, a tire having at least one component comprised of said rubber composition, including a sulfur cured rubber composition. Representative examples of such tire components are, for example, tire treads, particularly tire base of a tire having a tread of a cap/base construction, as well as tire sidewalls.

FURTHER DESCRIPTION OF THE INVENTION

Various pentaerythritol compounds are sometimes used in various rubber compositions for plasticizing the rubber mixture to aid in the processing of the rubber composition by, for example, reducing its mixing viscosity in internal rubber mixer. However, for this invention, specified aromatic derivatives of pentaerythritol are used in the practice of this invention which have been observed to, and therefore for a purpose of, enhancing tear resistance.

The pentaerythritol derivative as pentaerythritol tetrabenzoate is available from the Aldrich Chemical Company. The pentaerythritol derivative as pentaerythritol tetrakis (3,5-di-tert-butyl-4-hydroxyhydrocinnamate) is available from the Aldrich Chemical Company.

While the mechanism of reducing resistance to tear (peel adhesion to itself) of a rubber composition by use of the pentaerythritol tetrabenzoate or pentaerythritol tetrakis (3,5-di-tert-butyl-4-hydroxyhydrocinnamate) may not be completely be understood, it is envisioned that (A) a strong interaction is formed between a reinforcing filler (e.g. carbon black or silica) surface contained within the elastomer composition and the very polar portion of the pentaerythritol derivative, (B) an interaction exists between the aromatic portion of the pentaerythritol derivative. Such interactive phenomenae is believed to create a resistance to tear resistance (peel adhesion to itself) for the rubber composition at elevated temperatures under dynamic working conditions, and (C) an interaction in an unknown nature occurs between the low molecular weight polyester and said above derivative(s).

It is believed that the pentaerythritol derivative may act somewhat as a coupling agent between such reinforcing filler(s) and diene-based elastomer host which tends to control, or inhibit, tear, or cohesive breakdown of a diene based elastomer composition properties under conditions of elevated temperatures and dynamic conditions. This is considered herein to be particularly beneficial for rubber tire applications where heat build-up, and accompanying elevated temperatures under dynamic working conditions are present.

A polyester sebacate is available from the C. P. Hall Company as PLASTHALL P-1070 with a reported molecular weight (number average) of about 2000 and a reported melt point of about −22° C. according to American Oil Standard Test No. AOCS TR1A-164.

In the practice of this invention, as herein before pointed out, the rubber composition is comprised of at least one diene-based elastomer, or rubber. Such elastomers are typically selected from homopolymers and copolymers of conjugated dienes and copolymers of conjugated diene(s) and vinyl aromatic monomers such as, for example, styrene and alpha-methylstyrene, preferably styrene. Such dienes may, for example, be selected from isoprene and 1,3-butadiene and such vinyl aromatic monomers may be selected from styrene and alpha-methylstyrene. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70 to 95 percent trans), low vinyl polybutadiene rubber (10 to 30 percent vinyl), high vinyl polybutadiene rubber (30 to 90 percent vinyl).

In one aspect, the rubber may preferably be comprised of at least two diene-based rubbers. For example, a combination of two or more rubbers is preferred such as cis 1,4-polyisoprene rubber (natural or synthetic, although natural is usually preferred), 3,4-polyisoprene rubber, isoprene/butadiene copolymer rubber, styrene/isoprene/butadiene rubber, emulsion and solution polymerization derived styrene/butadiene rubbers, cis 1,4-polybutadiene rubbers, medium vinyl polybutadiene rubbers (30 to 55 percent vinyl), high vinyl polybutadiene rubbers (55 to 90 percent vinyl) and emulsion polymerization prepared butadiene/acrylonitrile copolymers.

Such elastomers are intended to include tin-coupled and/or silica-coupled end functionalized organic solution polymerization prepared elastomers (ie: for example, amine and hydroxyl end functionalized elastomers) and, also lithium produced solution polymerization prepared elastomers containing units derived from isoprene, 1,3-butadiene and styrene which have been coupled with tin tetrachloride or silicon tetrachloride.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, coupling agent, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur-vulcanizable and sulfur-vulcanized material (rubbers), the additives mentioned above are selected and commonly used in conventional amounts.

The composition of the present invention may contain conventional amounts of known rubber chemicals.

Typical amounts of tackifier resins, if used, may comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants comprise about 1 to 5 phr. Typical amounts of fatty acids, if used, which are usually comprised primarily of stearic acid, comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization of the rubber composition is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 5 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of most of the above additives are not considered to be an aspect of the present invention which is more primarily directed to the utilization of the aforesaid anti-reversion compound.

The rubber composition may be and is preferably prepared by mixing the diene-based rubber, carbon blacks and other rubber compounding ingredients, exclusive of the rubber curatives, in at least one sequential mixing step with at least one mechanical mixer, usually referred to as "non-productive" mix stage(s), to a temperature in a range of about 100° C. to about 180° for one to about 4 minutes, followed by a final mix stage in which the curatives, such as sulfur and accelerators, are added and mixed therewith for about 1 to about 4 minutes to a temperature within a range of about 90° C. to about 120° C. The terms "non-productive" and "productive" mix stages are well known to those having skill in the rubber mixing art.

It is to be appreciated that the rubber composition is conventionally cooled to a temperature below about 40° C. between the aforesaid mix stages.

It is to be further appreciated that the aforesaid duration of time for the required temperature maintenance for the mixing process(es) during the non-productive mix stages can be accomplished, for example, by (i) adjusting the motor speed of the mixer, namely reducing the motor speed after the desired temperature of the rubber composition is reached, in a variable speed mixer or by (ii) utilizing two or more mix stages sufficient to satisfy the duration requirement for the aforesaid maximum mixing temperature maintenance.

Vulcanization of the rubber composition of the present invention is generally carried out at conventional temperatures ranging from 100° C. to 200° C. Preferably, the vulcanization is conducted at temperatures ranging from 110° C. to 180° C., usually at about 150° C. Any of the usual vulcanization processes may be used such as heating in a press or mold, heating with superheated steam or hot air or in a salt bath.

Upon vulcanization of the sulfur-vulcanized composition, the rubber composition of this invention can be used for various purposes. For example, the sulfur-vulcanized rubber composition may be in the form of a tread for a pneumatic tire which is the subject of this invention. Such tires can be built, shaped, molded and cured by various methods which are known and will be readily apparent to those having skill in such art. As can be appreciated, the tire may be a passenger tire, aircraft tire, truck tire and the like. Preferably, the tire is a passenger tire. The tire may also be radial or bias, with a radial tire being preferred.

The invention may be better understood by reference to the following examples in which the parts and percentages are by weight unless otherwise indicated.

EXAMPLE I

In this example, rubber compositions and identified herein as Control Sample A, Sample B and Sample C.

Control Sample A is a rubber composition comprised of solution polymerization prepared styrene/butadiene copolymer rubber (S-SBR) and polyester sebacate. Sample B is a similar rubber composition except that it contains pentaerythritol tetrabenzoate (PTB) in place of polyester sebacate. Sample C is a similar rubber composition except that it contains pentaerythritol tetrakis (3,5-di-tert-butyl-4-hydroxyhydrocinnamate) (PTHC) in place of polyester sebacate.

The rubber compositions were prepared by mixing the ingredients in several stages, namely, one non-productive stage (without the curatives) followed by a productive mix stage (for the curatives), then the resulting composition was cured under conditions of elevated pressure and temperature.

For the non-productive mixing stage, exclusive of the accelerator(s) and sulfur curatives which are mixed (added) in the final, productive mixing stage, the ingredients, including the elastomers, are mixed for about four minutes to a temperature of about 160° C. in an internal rubber mixer. In a final productive mixing stage the curatives are mixed with the rubber composition (mixture) in an internal rubber mixer; namely, the accelerator(s) and sulfur to a maximum temperature of about 110° C. for about three minutes.

The resulting rubber compositions were then vulcanized at a temperature of about 150° C. for about 18 minutes.

The following Table 1 relates to the ingredients used for the rubber compositions.

TABLE 1

| | Parts | | |
|---|---|---|---|
| Material | Sample A Control | Sample B | Sample C |
| Non-Productive Mixing Step | | | |
| E-SBR elastomer[1] | 137.5 | 137.5 | 137.5 |
| Carbon black[2] | 90 | 90 | 90 |
| Phenol/Formaldehyde resin[3] | 10 | 10 | 10 |
| Alkylphenol-acetylene resin[4] | 15 | 15 | 15 |
| Zinc oxide | 2 | 2 | 2 |
| Antioxidant[5] | 1 | 1 | 1 |
| Stearic acid | 1 | 1 | 1 |
| Polyester sebacate[6] | 10 | 0 | 0 |
| PTHC[7] | 0 | 0 | 10 |
| PTB[8] | 0 | 10 | 0 |
| Productive Mixing Step | | | |

TABLE 1-continued

| | Parts | | |
|---|---|---|---|
| Material | Sample A Control | Sample B | Sample C |
| Accelerator(s)[9] | 2.7 | 2.7 | 2.7 |
| Sulfur | 1 | 1 | 1 |

[1]Styrene/butadiene rubber obtained from the Goodyear Tire & Rubber Company prepared by cold emulsion polymerization at 10° C. or lower and containing 40% styrene and 37.5 phr aromatic oil based upon the E-SBR (e.g. 137.5 parts by weight contains 100 parts by weight rubber hydrocarbon, or the E-SBR
[2]N234 carbon black, an ASTM designation
[3]Formaldehyde/resorcinol resin having a softening point of 110° C. obtained as CRJ-418 from the Schenectady Chemical Company
[4]An alkylphenol-acetylene copolymer resin obtained as powdered Koresin from the BASF Wyandotte Chemical Corp.
[5]Polymerized 1,2-dihydro-2,2,4-trimethylquinoline which is also called AgeRite Resin D when obtained from Vanderbilt
[6]Plasticizer obtained as Plasthall P-1070 from the CP Hall Company reported as having an average molecular weight (number average) of about 2000, a saponification number of about 595 and a melt point reported to be −22° C. (Test No. AOCS TR1A-164)
[7]Pentaerythritol tetrakis (3,5-di-tert-butyl-4-hydroxyhydrocinnamate) obtained from the Aldrich Chemical Company
[8]Pentaerythritol tetrabenzoate obtained from the Alrich Chemical Company
[9]Sulfenamide and guanidine accelerators The physical properties for the resulting vulcanized rubber compositions are shown in the following Table 2. The various tests are considered herein to be well known to those having skill in such analytical art.

TABLE 2

| | Control Sample A | Sample B | Sample C |
|---|---|---|---|
| Tensile, break-strength (MPa) | 15.2 | 15.0 | 15.8 |
| Elongation @ break (%) | 578 | 590 | 595 |
| 300% modulus (MPa) | 6.7 | 6.6 | 6.8 |
| Hardness | | | |
| Shore A at 23° C. | 80.2 | 83.7 | 82.3 |
| Shore A at 100° C. | 52.3 | 50.8 | 51.3 |
| MDR Rheometer (150° C., Data) | | | |
| Maximum torque (dNm) | 7.1 | 9.2 | 9.1 |
| Minimum torque (dNm) | 2.7 | 2.4 | 2.7 |
| Delta torque | 4.5 | 6.8 | 6.4 |
| T90 (minutes) | 10.0 | 13.2 | 14.1 |
| T1 (minutes) | 4.4 | 4.9 | 4.9 |
| Peel Strebler Adhesion to Self | | | |
| Average load (MPa)[1] | 8.2 | 46.6 | 49.9 |

[1]Peel adhesion comparison for the Samples was conducted for peel adhesion of the respective Sample composition to itself at 120° C.. Higher values are preferred. For example in the above Table 2, it is seen that peal adhesion values for Sample B and Sample C increased by 468 and 508 percent, respectively, as compared to Control Sample A. Thus the rubber compositions of Sample B and C are considered herein to be more resistant to crack propagation.

The term "peel adhesion to self" refers to a value, in Newtons, for interfacial adhesion by pulling one rubber composition away from another (the same rubber compound in this case) at a right angle to one untorn rubber with the two ends of the rubber samples being pulled apart at a 180 degree angle to each other using an Instron instrument. The area of contact of the two rubbers is determined by placement of a Mylar sheet between the two test samples with a cut-out portion of the Mylar sheet allowing the two samples to contact each other during the during the curing of the samples. The samples are then pulled apart and the force in Newtons measures. Further reference to such or similar test may be found, for example, in U.S. Pat. No. 5,310,921 and in ASTM D4393 except that a sample width of 1.3 cm is used and a clear Mylar film with a cut-out window of 5 mm width is inserted between the test samples.

From Table 2 it can readily be seen that the tensile and modulus properties of the rubber composition, which are considered herein to relate to stiffness of the compound, are maintained as the peel adhesion is increased for the pentaerythritol derivative-containing Samples B and C as compared to Control Sample A.

This is considered herein to be significant in that a tire tread of such rubber compositions of Sample B and Sample C would otherwise be expected to exhibit at least equal to or possibly less resistance to tear and therefore a greater propensity to chip and chunk which are tear related properties of treads which are understood to be well known to those having skill in the tire tread art.

From Table 2 it also be seen that the state of cure and Delta torque of the rubber composition has been maintained for the Sample B and Sample C of the pentaerythritol derivative-containing rubber composition. This is considered herein to significant in that it is indicated that the durability of the rubber composition is maintained.

Indeed, the addition of the pentaerythritol derivatives demonstrated an observed significant improvement in the tear resistant property for Sample B and for Sample C as compared to Control Sample A which is considered herein to be beneficial for maintaining the general toughness of a tire with a tread of such compositions.

The addition of the pentaerythritol derivatives demonstrated an observed significant improvement in the Rheometer scorch time (T1 times greater) property for Sample B and for Sample C as compared to Control Sample A which is considered herein to be beneficial for precluding penetration into a component of a tire which is comprised of such rubber composition such as, for example, a tire tread.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition which comprises, based upon parts by weight per 100 parts by weight elastomer (phr);
    (A) 100 parts by weight of at least one diene-based elastomer,
    (B) about 1 to about 20 phr of
        (1) pentaerythritol tetrabenzoate (PTB) or
        (2) pentaerythritol tetrakis 3, 5-di-tert-butyl-4-hydroxyhydrocinnamate) (PTHC), and
    (C) about 1 to about 20 phr of polyethylene sebacate having a molecular weight in a range of about 1000 to about 3000 so long as it has a melt point below 0° C.

2. The rubber composition of claim 1 wherein said additive is pentaerythritol tetrabenzoate.

3. The rubber composition of claim 1 wherein said additive is pentaerythritol tetrakis (3,5-di-tert-butyl-4-hydroxyhydrocinnamate).

4. The rubber composition of claim 1 as a sulfur cured rubber composition.

5. The rubber composition of claim 2 as a sulfur cured rubber composition.

6. The rubber composition of claim 3 as a sulfur cured rubber composition.

7. An article of manufacture having at least one component comprised of the rubber composition of claim 1.

8. An article of manufacture having at least one component comprised of the rubber composition of claim 4.

9. An article of manufacture having at least one component comprised of the rubber composition of claim 5.

10. An article of manufacture having at least one component comprised of the rubber composition of claim 6.

11. A tire having at least one component comprised of the rubber composition of claim 1.

12. A tire having at least one component comprised of the rubber composition of claim 4.

13. A tire having at least one component comprised of the rubber composition of claim 5.

14. A tire having at least one component comprised of the rubber composition of claim 6.

15. A tire having a tread comprised of the rubber composition of claim 1.

16. A tire having a tread comprised of the rubber composition of claim 4.

17. A tire having a tread comprised of the rubber composition of claim 5.

18. A tire having a tread comprised of the rubber composition of claim 6.

19. A tire having at least one component comprised of the rubber composition of claim 1 wherein said diene-based elastomer is selected from at least one of homopolymers of isoprene, homopolymers of 1,3-butadiene, copolymers of isoprene and 1,3-butadiene and copolymers of styrene and at least one of isoprene and 1,3-butadiene.

20. A tire having a tread comprised of the rubber composition of claim 4 wherein said diene-based elastomer is selected from at least one of homopolymers of isoprene homopolymers of 1,3-butadiene, copolymers of isoprene and 1,3-butadiene and copolymers of styrene and at least one of isoprene and 1,3-butadiene.

* * * * *